July 18, 1944.  O. K. KELLEY  2,353,905
POWER TRANSMISSION
Filed June 27, 1941  2 Sheets-Sheet 1
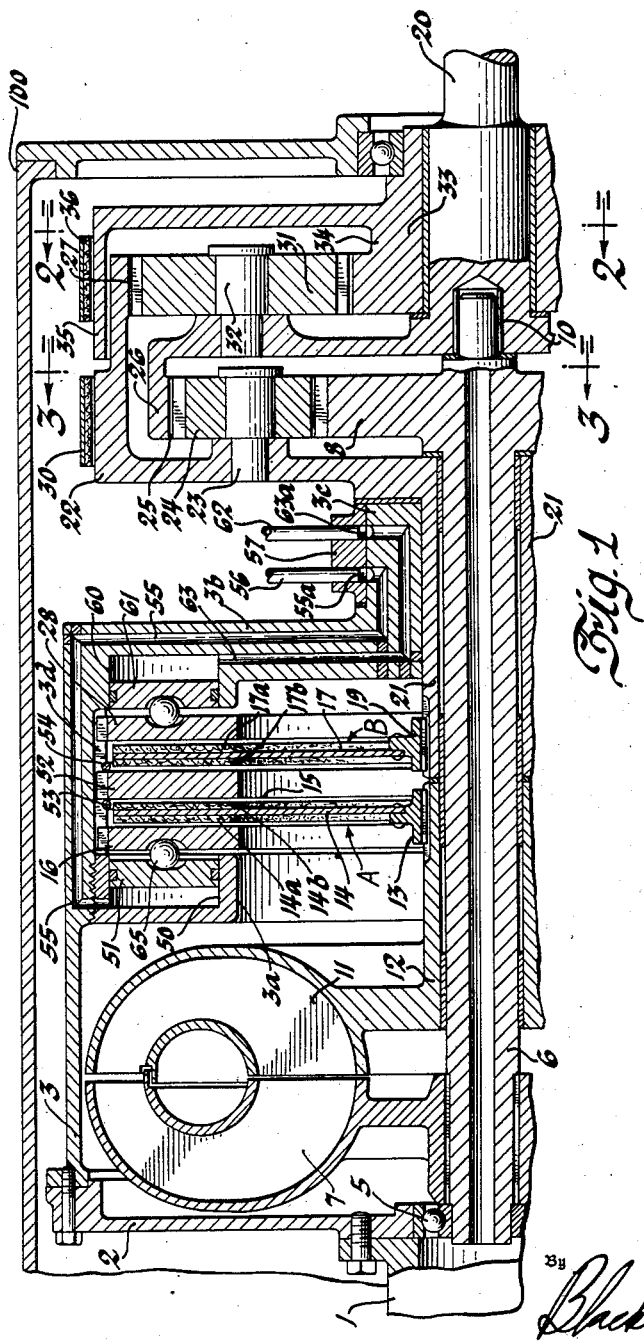
Inventor
Oliver K. Kelley
By Blackmore, Lyman & Flint
Attorneys

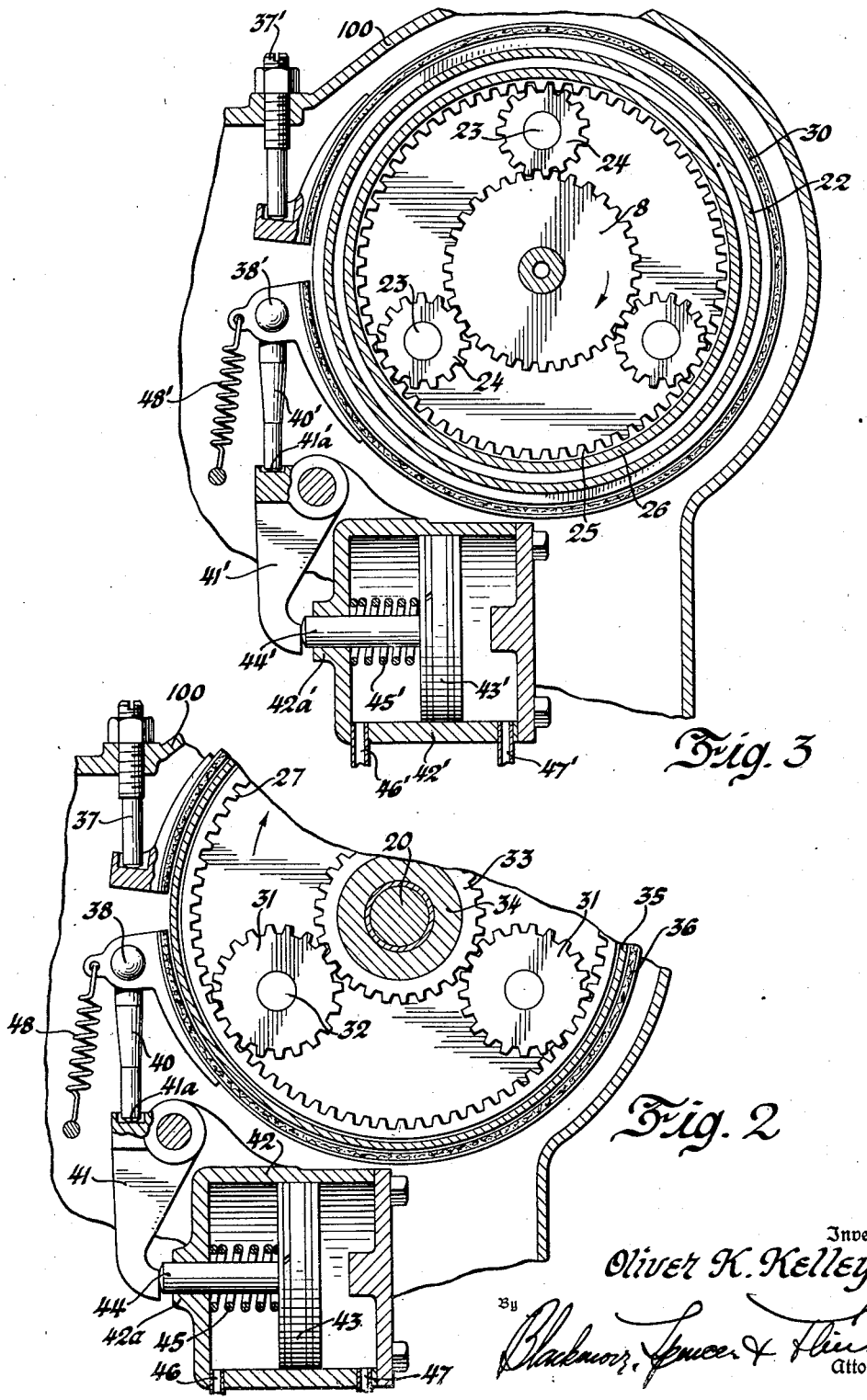

Patented July 18, 1944

2,353,905

UNITED STATES PATENT OFFICE 2,353,905

POWER TRANSMISSION

Oliver K. Kelley, Birmingham, Mich., assignor to General Motors Corporation, Detroit, Mich., a corporation of Delaware Application June 27, 1941, Serial No. 400,014

24 Claims. (Cl. 74—189.5)

The present invention relates to variable speed ratio gearing for conversion of power, especially for use in motor vehicles, and relates in particular to combinations providing multiple torque paths between power and load, in which fluid turbine devices are arranged to assume coupling drive during driving intervals when torque is being sustained in part by gearing disposed to transmit variable speed couples.

A particular feature of my disclosure is a novel arrangement of fluid turbines and gearing which provides dual selective coupling means to the power providing element for low ratio driving of the load with reaction afforded therefor, by gear elements, and which provides direct drive couple by compound coupling of both the dual means, wherein a range of driving ratios is afforded for all driving condition requirements.

It is a feature of my invention to provide one of the lower ratio drives in which the said fluid turbine coupling means is inactive to transmit torque, so that the operator may select this driving condition for continued drive, indefinitely, with the fluid turbine in effect idling. This feature enables the device to be utilized for vehicle drive purposes which require long continued driving through the gearing, without consideration of the heating of the turbine working fluid, which otherwise would be caused by long continued differential slip.

In the present example of the disclosure, the combination is of a compound epicyclic gear, coupled to the power through two clutching means, selectively operated for yielding two forward ratios through the gearing, a direct drive couple, and reverse drive. The compound gear reaction member remains engaged or locked for the two low forward speeds, while the two clutching means are alternated for selection of "low" or "2nd," and the two clutching means are both engaged for "high" or "direct." In "reverse," a separate reaction member is locked, from that used for the forward geared speed ratios, the compound gearing being used as a simple planetary, while only one of the clutching means is engaged.

With this arrangement, it is made possible to initiate the drive of the vehicle by merely locking the forward reaction member, with one of the clutch means then being engaged, and leaving the reaction member engaged until "high" gear drive is desired. To transfer from "low" to "2nd" or the intermediate ratio, it is only necessary to disengage one of the clutching means while engaging the other. To transfer from "2nd" to "high" it is only required to bring in the other of the two clutching means, while releasing the holding force for the reaction member.

Thus is provided a simple ratio changing regime wherein the reaction member, once engaged or applied, remains applied until "high" gear drive is desired. This feature is made of greater utility by the use of a self-energised reaction member.

In providing this simple ratio shift control regime, the invention makes use of the fluid turbine drive device in a peculiar, and in an unique manner. As will be understood from the following description, one of the clutch means couples an element of the compound gear to the engine or power source through the fluid turbine device, while the other clutch means couples another element of the compound gear to the power source, directly. This arrangement therefore makes it possible for the operator to choose drive through the fluid turbine device, or not, as desired.

As will be more clearly understood further, the clutch means combination which sets up initial drive for "low" gear, initiates the forward motion of the vehicle through the differential torque action of the fluid turbine device, thus affording a smooth and easy start from standstill. It should be noted that the arrangement may make use of a fluid turbine device of high efficiency design without respect to creep, due to the fact that the clutch means involved in "low" gear drive is disengageable, and likewise the compound gear reaction member is subject to release, there being then two distinctly separate means, either of which may be utilized to break the path of torque between the power and the load, or to couple it.

Reference is herewith made to my United States Serial Number 124,283, filed February 5, 1937, and issued October 17, 1939, as United States Letters Patent 2,176,138, wherein is shown a four-speeds forward and reverse combination, the fluid turbine device of which is effective to transmit torque in all of the ratios, including "high" or "direct." The same is true in the disclosure of my Serial Number 267,024, filed April 10, 1939, and issued August 13, 1940 as United States Letters Patent 2,211,233.

In the present invention, instead of demultiplying the input speed drive to the fluid turbine, which among other benefits, demultiplies the creep by varying the ratio drive to the impeller, I obtain freedom from undesirable creep effect by breaking the path of torque not only between the engine and the impeller, but also by releasing the compound gear reaction member.

Whereas, in the prior inventions noted above, there is no interruption of the potential torque available by rotation of one or both members of the fluid turbine unit, the present invention, disclosing a three-speeds forward combination, shows how to render the fluid unit inactive after initial starting drive, and to proceed indefinitely in a purely geared drive, under heavy gradient or load conditions, as along as desired, without subjecting the fluid of the unit to overheating from differential slip. A further feature of value is the provision for utilizing the fluid unit as a torque divider or reverse-torque coupler, when it is desired to drive in "high." This arrangement enables the torque capacity requirement for the control clutch means to be low, in that the fluid unit under these circumstances assumes a portion of the driving torque, therefore the space requirement for the two clutching means is reasonably small, and they may then be mounted neatly in the space between the fluid unit compartment and the compound gear group, coupled to the engine by a surrounding drum inside which both clutch means and fluid unit are housed.

A novel feature appears in the coupling arrangement for the compound gear group, wherein two elements thereof, fixed for rotation together, are coupled to the power shaft by one of the clutch means. All forward driving reaction for drive through the gearing is provided by one element of the gearing. The output connected member of the compound gear group rotates fixedly with two elements of the group, one of which is related orbitally to the single reaction element, and the other of which is related annularly to the orbital member selectively coupled to the engine for "2nd" speed drive.

The advantages of this grouping of elements are, of course, embodied in the above paragraphs descriptive of the results obtained by the arrangement, but it is also true that the compound gear group arrangement yields a further benefit in compact neat association of gear elements, such that the whole space for a three-speed-and-reverse gear transmission assembly is much less than that required for standard gear forms.

These and other objects and advantages will be apparent in detail, as the following drawings are studied with respect to the accompanying specification.

Figure 1 is an elevation section of a transmission assembly embodying my invention, the engine or power shaft being located at the left, and the load shaft connecting to the vehicle drive at the right.

Figure 2 is a partial section elevation of a portion of Figure 1 to show the details of the mounting of the clutch means of Figure 1.

Figure 3 is a section view of the structure of Figure 1 taken at 3—3, and describes a conventional form of control mechanism for one of the reaction locking members of the transmission.

Figure 4 is a side elevation outline drawing of the drive device, showing the external controls.

Figure 1 shows the general sectional arrangement of driving parts of the invention. The engine shaft 1 is attached to the flywheel flange 2 which in turn is fixed to overhanging drum 3. Bearing 5 supports one end of shaft 6 to which is attached fluid flywheel rotor 7, and planetary sun gear 8, the shaft 6 being piloted at bearing 10 in the forward end of transmission output shaft 20.

Fluid rotor 11 mates with and faces rotor 7, being affixed to sleeve 12, coupled to hub 13 of clutch plate 14, having facings 14a and 14b.

The drum 3 is formed with clutch plate surface 15 against which plate 14 may be gripped by movable presser plate 16. Similarly clutch plate 17, with facings 17a and 17b, may be gripped between face 18 of member 3, by presser plate 28, the actuation means for which will be described later. Hub 19 for plate 17 is fixed to hollow shaft 21, which is extended at the right in drum 22, carrying spindles 23 for planet gears 24 meshing with sun gear 8. Annulus gear 25 meshes internally with planet gears 24, and is coupled by drum 26 to output shaft 20. Drum 22 is extended to the right, and has formed on its inner periphery, annulus gear 27, its external surface affording gripping space for brake band 30.

Annulus gear 27 meshes with planet gears 31 spindled on pins 32 carried by drum 26. The sun gear 33 meshes with planets 31, its sleeve 34 being extended radially to form drum 35, on which brake band 36 may be clamped. As will be understood further, the invention utilizes reaction-locking bands of self-wrapping type.

For simplicity the first clutch assembly 14 will be herein designated as clutch A, and the clutch assembly at 17, as clutch B.

To obtain the lowest speed ratio of drive to shaft 20, clutch A is engaged, coupling the engine shaft 1 to rotor 11 of the fluid flywheel. The rotation of rotor 11 causes rotor 7 to rotate at a slip ratio to engine speed, applying rotation to sun gear 8.

Application of brake band 30 to drum 22 provides reaction for the torque of the vehicle, the forward driving component on sun gear 8 yielding a backward component on annulus gear 25, driving the load shaft 20 backwards. This yields reverse drive.

For low gear drive, band 36 is applied, causing sun gear 33 to stand still. Forward rotation of sun gear 8 working against the reaction of annulus gear 25 fixed to the non-rotating load shaft 20, applies a forward component to spindles 23, drum 22 and annulus gear 27. The action of force applied to annulus gear 27 reacting from fixed sun gear 33 causes a forward low speed component to be applied to planet pins 32, drum 26 and output shaft 20. This is at a low speed ratio.

Transferring engine drive from clutch A to clutch B, with brake 36 still applied to drum 35, relieves the fluid flywheel 7—11 from direct engine torque, and driving drum 22 and annulus 27 directly at engine speed.

Under these circumstances, a forward component is applied to drum 26 at a higher speed ratio than when the drum 22 was driven at a reduction speed ratio through the fluid flywheel 7—11. This is 2nd speed ratio.

At the same time, annulus gear 25, having a forward speed component of less than the spinning component applied by drum 22 to planet carrier pins 23, sun gear 8 receives an overspeed ratio of drive, spinning it, shaft 6 and fluid rotor 7 forward faster than engine speed. The fluid couple between rotors 7 and 11 causes rotor 11, sleeve 12 and clutch plate 14 to spin forward at more than engine speed.

Now releasing of brake 36, while engaging clutch A and holding clutch B engaged provides a new set of couples, the net effect of which is to yield direct drive. This also pulls the spinning sun gear 8, shaft 6 and rotors 7—11 down to engine speed.

The couple established is through the sun gear 8 and carrier pins 23 which now tend to rotate at the same speed, except for the slight slip of the fluid flywheel 7—11, which permits the sun gear 8 to lag by a few revolutions per minute. The efficiency of the fluid flywheel is sufficiently high at the normal operating speeds, that the output shaft 20 rotates at 98 to 99 per cent of engine speed revolutions.

In shifting down to second speed ratio from direct drive, the clutch A is released and brake 36 applied. This permits the fluid rotor 11 to be released to follow the overspeed component applied to the rotor 7, shaft 6 and sun gear 8 by the reaction of the drive through the gears when second speed is called for by engagement of clutch B and locking of brake 36.

The disclosure of Figure 1 is given, to provide the details of the clutch actuation system. The drum 3 is webbed at 3b, with extension 3c extending to the right. The inner portion of the drum 3 is splined at 3d to act as a guide for clutch presser plates 16 and 28. The support web 52 which lies in between the plates 14 and 17 is locked against axial movement by lock rings 53 and 54, which is conventional practice. A separately cast member 3a is threaded into the inner part of the drum 3 to provide a number of cylinders 50 for a plurality of spaced clutch pistons 51.

Passage 55 is drilled in drum 3, and its annulus channel 55a in extension 3c registers with feed pipe 56 in gland 57 connected with a source of fluid pressure, by suitable control means.

Likewise cylinders 60 in the web 3b of drum 3 accommodate pistons 61 which engage presser plate 28 to cause clutch plate 17 to rotate with drum 3, the fluid pressure passage 63 in the web 3b and extension 3c connecting cylinder 60 with annulus channel 63a registering with pipe 62 in gland 57.

Springs (not shown) are mounted in a conventional manner at intervals about the interior of drum 3 to exert a normal pressure on presser plate 16 to the left and plate 28 to the right, so that with no fluid pressure available, both clutch plates 14 and 17 will be relieved of torque. With fluid pressure in pipe 56, passage 55 and cylinders 50, clutch A will be engaged. With fluid pressure in pipe 62, passage 63 and cylinder 60, clutch B will be engaged, while the pressure in both systems, both clutches A and B will be engaged, providing direct or high gear drive.

Extension means between the pistons 51 and 61 and their corresponding presser plates 16 and 28 may be steel balls 65 such as indicated in the drawing, cylindrical studs, or similar thrust elements.

The axial movement of the clutch hubs 13 and 19 on the spline joints of shafts 12 and 21 is slight, and the idling drag of either of plates 14 and 17 is practically nil, because of the utilization of fluid pressure application at multiple points around the main axis, and the axial release movement when the fluid pressure is taken away, by a plurality of release springs. The use of a single plate clutch such as shown, for both the A and B clutches yields an economy of space which is of value in present day motor cars, since the customary hump in the vehicle floorboards largely disappears in the installation of the present invention.

For controlling either of brake bands 30 or 36, a structure such as described in Figure 2 suffices. Band 36 surrounds drum 35, and is anchored by stud 37 threaded in the transmission casing 100. The other end of the band 36 is pivoted at 38 to thrust rod 40 seated in notch 41a of rocker arm 41 pivoted on the transmission casing 100, normally relieved by spring 48. Brake servo cylinder 42, mounted on, or integral with casing 100, encloses piston 43, the thrust rod 44 of which extends through guide 42a of cylinder 42 to actuate the longer arm end of rocker arm 41. Spring 45 fits around the rod 44 of piston 43, normally tending to release locking pressure on brake band 36. Fluid pressure pipes 46 and 47 enter cylinder 42 at the right and the left of piston 43 and are fed by fluid pressure from a source connected to an external control system.

This control and actuation method is duplicated for brake 30, Fig. 3, with fluid pressure for brake actuation provided by a pipe 47' so that the operator's master control device may direct the fluid pressure available for servo transmission purposes to the set of pressure pipes in the following ratio shift pattern:

|  | Pipe 47 | Pipe 47' | Pipe 56 | Pipe 62 |
| --- | --- | --- | --- | --- |
| Low | x |  | x |  |
| 2nd | x |  |  | x |
| High |  |  | x | x |
| Reverse |  | x | x |  |

The above pressure application pattern corresponds to the following actuation pattern of the clutch and brake elements designated:

|  | Band 36 | Band 30 | Clutch A | Clutch B |
| --- | --- | --- | --- | --- |
| Low | x |  | x |  |
| 2nd | x |  |  | x |
| High |  |  | x | x |
| Reverse |  | x | x |  |

(x designates application or engagement of the element noted.)

It will be observed that each of the ratio driving conditions calls for simple groups of two elements only to be actuated, thus requiring a very simple form of control apparatus.

For neutral, the absence of fluid pressure in any of the pipes suffices. For normal forward drive, it is not necessary to release band 36, when neutral is desired, since the removal of fluid pressure from the clutches A and B breaks the path of torque.

Figure 3 is a diagram similar to that of Figure 2, describing the actuation mechanism for the reverse reaction locking band 30, encircling drum 22, the fixed end of the band being anchored by adjustable stud 37' to the casing 100. The movable end 38' is pivoted to thrust rod 40' seated in notch 41a' of rocker arm 41' pivoted on the casing, and the action end of arm 41' is engaged by piston rod 44' of piston 43' sliding in servo cylinder 42', integral with, or mounted on the casing 100. Spring 45' returns the piston 43' to non-energised position, and supplementary spring 48' aids in releasing the band 30 from the drum, augmenting the self-tension of the band. Fluid pressure in pipe 47' and to the right of piston 43' in cylinder 42' moves the piston 43' and rod 44' moving arm 41' up and clockwise, causing rod 40' to apply force to end 38' of the band 30 which brakes drum 22, for setting up reverse drive reaction.

This whole arrangement resembles that for the actuation of band 36 of Figure 2.

Figure 4 is given to show the external arrangement of the housing 100, the disposition of the forward portion 100' of the housing, and the arrangement of the adjustable brake band studs 37, 37' and the servo cylinders 42 and 42' for the brake actuation. Control rods 101 and 102 are merely conventional, along with valve housing 103, with respect to the present invention.

The present invention is not directed toward a specific control system, except insofar as the structures described will need, of course, some orderly method of control for distribution of the ratio actuation pressures in a pattern such as described above.

*Operation*

In describing the operation, it is assumed that the operator is in control of a fluid pressure directing system capable of providing the speed ratio selection described in the preceding tables. With the vehicle standing still and the engine running, it is assumed that the source of fluid pressure is available to provide servo actuation. There being no pressure in any of the actuation pressure pipes 47, 47', 56 or 62, none of the clutches or brakes are actuated, and there is no drive, or neutral.

Fluid pressure in pipe 47 of Figure 2 moves piston 43 and rod 44 against the force of spring 45, rocking arm 41 to apply thrust on rod 40 to clamp band 36 on drum 35, which locks sun gear 33 on hollow shaft 34. Next, fluid pressure in pipe 56 causes pistons 51 to load presser plate 16 to grip plate 14 against abutment 52 of drum 3, applying engine torque through clutch A to sleeve 12 and rotor 11 of the fluid turbine device.

Rotation of rotor 11 sets rotor 7 in motion, by the well-known effect of the fluid flywheel turbine, which rotates shaft 6 and sun gear 8. Initial reaction between sun gear 8 and annulus gear 25 affixed to the output shaft 20 provides a forward component to carrier drum 22 for planet spindles 23, and to annulus gear 27, which reacting from non-rotating sun gear 33 provides a forward component on planet pins 32, drum 26 and output shaft 20. Now annulus gear 25, which was standing still, must rotate with the drum 26 and shaft 20. The net effect of the compound couple is to enforce forward rotation of shaft 20 at low speed, all torque being carried by the fluid turbine device 7—11.

Relieving fluid pressure from pipe 56 and applying it to pipe 62 releases clutch A, and forces pistons 61 against presser plate 28, clamping the plate 17 of clutch B against abutment 52. For smooth transition, it is preferred that the rate of exhaust of pressure from line 56 permits pressure to be built up from pipe 62 for clutch B actuation such that clutch A continues to carry a given low torque value until clutch B has been brought up to its proper second speed ratio capacity. This prevents a neutral dwell between low and second speed ratios on the up shift.

Now in driving in second speed, the fluid device 7—11 is not carrying the torque, but merely idles, although its flywheel mass rotating with shaft 6 and sun gear 8 is available as a torque stabilizing influence. Clutch B connects engine flywheel drum 3 with sleeve 21 of drum 22, the power being applied by annulus gear 27, which reacting from non-rotating sun gear 33, causes planet pins 32, drum 26 and output shaft 20 to rotate forwardly at a somewhat higher speed ratio than the aforesaid "low."

Since annulus gear 25 is fixed to rotate with shaft 20, it has a forward speed component at less than engine speed applied to drum 22 and carrier pins 23 by clutch B. Sun gear 8 therefore receives a couple from these differential rotations, yielding a forward speed component greater than engine speed. The actual net speed ratios provided by the compound gear combination of the invention may be determined by the need of the designer, who is at liberty to choose diameters of the gears 8, 24, 25, 32, 31 and 27 within standard design limits for strength of the parts to carry the designed torques and loads.

When it is desired to couple for direct drive, band 36 is required to be released by relieving the fluid pressure from pipe 47, permitting the natural tension of band 36 to detach it from the drum 35, and spring 45 to retract piston 43 and rod 40. The auxiliary spring such as shown at 48 of Figure 2 may be used to supplement the release action.

The taking away of the reaction effect of sun gear 33 by the freeing of band 36 from drum 35 would permit the engine, thus relieved momentarily from load, to accelerate. Since the vehicle speed would not be changing appreciably, neither would annulus gear 25 change, but drum 22 and carrier 23 would tend to move forward faster, tending to accelerate sun gear 8 still faster, which would be an undesirable result, when it is remembered that for direct drive, clutch A must couple the drive by absorbing the speed differential between drum 3 which is rotating with the engine, and rotor 11 rotating with rotor 7, shaft 6 and sun gear 8 at a speed greater than engine speed. To prevent the shaft 6, sun gear 8 and fluid unit 7—11 from thus accelerating during the shift over interval, I choose a direction of wrap of band 36 with respect to the normal forward rotation component such that even though the fluid pressure below piston 43 be relieved, the torque reaction force on band 36 will be sufficient to overcome the release action of the band self-tension and the force of supplementary spring 48, and will not be relieved until the torque being assumed by clutch A and transmitted through the fluid unit 7—11, shaft 6, sun gear 8, creates a forward component on drum 35, by which time the clutch A has established its share of the direct-drive couple.

The transition into "direct" from "2nd" is made smooth by the fact that upon engagement of clutch A, the impeller 11 is pulled down to engine speed with the rotor 7 tending to rotate at a faster speed, the differential slip between them providing a torque-cushioning effect.

This arrangement of elements makes it possible to reduce the complexity of the external controls, since it will not be necessary to provide special valving to overlap the pressure relief and build-up characteristics of cylinder 42 and cylinders 60. To make this effect clear, the outline arrow shown on drum 35 of Figure 2 indicates the normal force of torque reaction for forward drive, on drum 35, and the full line arrow on the section of gear 8 of Figure 3 indicates normal forward rotation of the drive.

The direct drive couple is provided by clutch B applying engine speed direct to carrier pins 23, drum 22 and annulus 27, with clutch A driving the fluid unit 7—11, and shaft 6 with sun gear 8 at a small slip ratio. The gear combination 8—24—25 yields a first component to annulus gear 25, demultiplied by the design ratio of these gears.

The gear combination 27—31—33 yields a second component to sun gear 33 which has no driving torque effect, but merely causes the drum 35 to revolve forward at unit speed with the rest of the assembly.

It should be noted that the arrangement provides split torques through the two clutches A and B in direct drive, one path following the elements numbered 17—21—23, and the other following the elements 14—12—11—7—6—8. The gear group 8—24—25 therefore serves to recombine the divided torques, as would seem obvious to one skilled in the art.

This feature permits the coupling clutches A and B to be compressed into a reasonably small space, in view of their reduced torque capacity and slip capacity requirement, providing a saving in dimensions much needed in present day motor cars, most of which have a hump in the floorboards caused by the need for space for the transmission assembly. The utilization of single plate inter-ratio clutches instead of multiple disc clutches likewise affords a further saving in space.

The compound gear unit is likewise compact and provides three speeds forward and reverse in an axial space embracing only two groups of simple planetary units, each consisting of a sun gear, meshing planets and an annulus gear.

The driver may proceed to drive the vehicle indefinitely in "high" or "direct," at all speeds down to such a low speed that the torque capacity of the fluid unit 7—11 tends to vanish, when it is possible for the engine to idle practically unrestrained, although the clutches A and B are yet engaged. From a point of view of best utility, however, the so-called fluid flywheel involved in the present invention is so built that it yields an inherent high efficiency rather than a low creep factor. Experience teaches that the fluid flywheel as a simple mechanism does not provide both a low creep factor and high efficiency. Most commercial adaptations of this device tend to sacrifice efficiency for low creep factor, whereas in the present invention, the fluid turbine unit is so constituted as to provide high efficiency, the problem of creep being taken care of by interruption of the path of torque by action of the brake and clutch controls, which may be automatically released by various means.

In shifting down from "direct" to "2nd" brake 36 is actuated and clutch A is disengaged. Because of the directional hand of wrap of brake 36, the application of force by piston 43 is entirely and directly by servo pressure, with no self-wrapping action possible until brake drum 35 comes to a stop, and receives a reaction torque component tending to make it revolve backward. The brake 36 is therefore applied while the fluid pressure is being relieved from cylinders 50, and the assuming of full reaction torque by the brake then accelerates the sun gear 8, shaft 6 and the mass of rotors 7—11 to the stated given speed ratio above engine speed, because of the speed ratios embodied in the compound gear group. An expenditure of force to accelerate this mass to the new speed occurs during the time between which the clutch A has been released and the brake 36 first applied, tending to prevent the overspeeding of the engine such as would be normally experienced with a shift to a more advantageous speed ratio. The mass of these parts 6—8—7—11 when the fluid unit is filled with the working liquid is of sufficient value to provide a useful torque-cushioning effect on down-shift from "direct" to "second." It may be said that the mass thus absorbs energy, and gives it back to the driving system when shifting to "direct" from "2nd."

For gradient operation in mountainous country, or for quick bursts of acceleration in traffic, it is valuable to have easily operated means to compel a downship to a more advantageous speed ratio than "direct," and to perform the shift smoothly, as provided by the above described mechanism.

It is further desirable to have a geared speed ratio below "direct" for pulling under load through sand or mud or on heavy grades, in which the engine may operate at the peak of its torque curve, without requiring the fluid unit to be subjected to maximum slip for a long period, in that the slip losses of a fluid turbine drive unit are manifest in heat, which, if excessive, would cause gas formation in the working fluid, and consequent uneven operation effects such as surging and torque shock, both quite unpleasant at high speeds, and liable to damage the mechanism.

The invention herewith therefore provides a second speed ratio drive in which the fluid unit rotors idle at a common speed without being subject to the torque of the drive.

Downship to "low" from "second" requires that clutch B be released and clutch A engaged. This shift will be rarely needed or used. It is preferably accomplished by building up the fluid pressure in cylinders 50 while exhausting cylinders 60 through pipe 62, so that there is no neutral dwell.

The preceding description of operation covers all normal forward drive conditions of the mechanism. In maneuvering the vehicle in a restricted area, the reverse drive control is utilized. Assuming no fluid pressure in any of the pipes, and neutral drive, "reverse" requires band 30 to be actuated, and clutch A engaged.

If the external controls be so phased, it is possible for the operator of the vehicle to leave clutch A engaged in both low and reverse, and also in temporary neutral, and to alternate direction of movement of the vehicle by merely shifting actuation alternately between the bands 36 and 30, as will be obvious from examination of the preceding ratio pattern tables.

In viewing the compound gear group from the left of Figure 1, as in the diagram of Figure 3, it will be noted that a forward component on sun gear 8, with drum 22 stopped will provide a backward component on annulus gear 25, drum 26 and output shaft 20. The torque reaction force sustained by brake 30 is therefore "forward," in the same direction as indicated by the outline arrow of gear 8 of Figure 3. To avoid self-wrapping shock, I dispose the fixed and movable ends of brake 30 so that fluid pressure application of the movable end 38' will provide the sole energising force for reverse reaction locking.

It will have been understood by one skilled in the art reading the foregoing disclosure, that the invention described affords a novel and useful combination of compound gearing with a fluid turbine drive unit, yielding advantages in the ability of the operator to select a purely geared speed ratio for high torque needs, while introducing the fluid unit as an essential part of the drive for the initial starting of the vehicle, and for the most used top or "high" ratio, where it serves to cushion the drive and divide the torque as described.

The invention likewise provides advantages in compactness of structure both in gearing and in clutch combinations. It provides a selection of three forward speed ratios by manipulation of only two clutch elements, in the combinations given. The operator may choose to set aside the fluid drive unit, and drive through gearing indefinitely, or as long as desired. The torque of the drive may be interrupted at one of two points for facility of control, and for avoidance of creep when the vehicle is to be held at a standstill.

These and other advantages are above described. The invention as set forth herein is believed to fulfill the objects enumerated clearly, and it is understood that one skilled in the art may introduce substitutions for the elements described herein as essential, without departing from the spirit thereof, or from the statements of the invention in the appended claims.

I claim:

1. In power transmissions, the combination of a power shaft and a load shaft; a compound epicyclic gear unit having two elements adapted to be coupled to said power shaft, two elements rotating with said load shaft, and two elements adapted to be locked against rotation to provide torque reaction for drive through the gears of said unit; coupling means for said first two named elements, including a fluid turbine drive unit arranged to transmit the power of said power shaft to one of said first named elements, and controllable actuation mechanism operative to provide either selective drive between said power shaft and said first two named elements, or compound drive by both of said elements at the will of the operator.

2. In power transmissions, the combination of a power shaft and a load shaft; a compound epicyclic gear unit having two elements adapted to be coupled to said power shaft, two elements rotating with said load shaft, and two elements adapted to be locked against rotation to provide torque reaction for drive through the gears of said unit; coupling means for said first two named elements, including a fluid turbine drive unit arranged to transmit the power of said power shaft to one of said first named elements, controllable actuation mechanism operative to provide selective drive between said power shaft and either of said first two named elements, or compound drive by both of said elements at the will of the operator, and fluid pressure servo means effective to operate said actuation mechanism for establishing a predetermined range of speed ratios of drive between said shafts by said gear unit.

3. In power transmissions, the combination of a power shaft and a load shaft; a compound epicyclic gear unit having two elements adapted to be coupled to said power shaft, two elements rotating with said load shaft, and two elements adapted to be locked against rotation to provide torque reaction for drive through the gears of said unit; coupling means for said first two named elements, including a fluid turbine drive unit arranged to transmit the power of said power shaft to one of said first named elements, controllable actuation mechanism operative to provide selective drive between said power shaft and either of said first two named elements, or compound drive by both of said elements at the will of the operator, and controllable auxiliary power means for actuation of said mechanism for selected speed ratios of drive between said shafts by said gear unit.

4. In power transmissions, the combination of a power shaft and a load shaft; a compound epicyclic gear unit having two elements adapted to be coupled to said power shaft, two elements rotating with said load shaft, and two elements adapted to be locked against rotation to provide torque reaction for drive through the gears of said unit; coupling means for said first two named elements, including a fluid turbine drive unit arranged to transmit the power of said power shaft to one of said first named elements, controllable actuation mechanism operative to provide selective drive between said power shaft and either of said first two named elements, or compound drive by both of said elements at the will of the operator, and means controlling said mechanism effective to establish changes of speed ratio between said shafts without release of driving torque therebetween during ratio transition interval.

5. In power transmissions, in combination, a power shaft, a load shaft, a compound epicyclic gear having two elements adapted to be coupled to said power shaft, two elements fixed for rotation with said load shaft, and a forward drive reaction element; locking means for said element, a clutch arranged to couple one of said elements to the power shaft, a fluid turbine drive unit, a second clutch arranged to couple the second of said elements to said power shaft through said unit, actuation means for said locking means and said clutches, and controllable fluid servo pressure means effective to energise said actuation means for selective drive between said shafts to provide two forward geared speed ratios and direct drive ratio.

6. In power transmissions, in combination, a power shaft, a load shaft, a compound epicyclic gear having two elements adapted to be coupled to said power shaft, two elements fixed for rotation with said load shaft, and a forward drive reaction element; locking means for said element, a clutch arranged to couple one of said elements to the power shaft, a fluid turbine drive unit, a second clutch arranged to couple the second of said elements to said power shaft through said unit, actuation means for said locking means and said clutches, and controllable auxiliary power means effective to energise said actuation means for selective drive between said shafts to provide two forward geared speed ratios and direct drive ratio.

7. In power transmissions, in combination, a power shaft, a load shaft, a compound epicyclic gear having two elements adapted to be coupled to said power shaft, two elements fixed for rotation with said load shaft, and a forward drive reaction element; locking means for said element, a clutch arranged to couple one of said elements to the power shaft, a fluid turbine drive unit, a second clutch arranged to couple the second of said elements to said power shaft through said unit, actuation means for said locking means and said clutches, and controls for said actuation means effective to energise said actuation means for selective drive between said shafts to provide two forward geared speed ratios and direct drive ratio.

8. In power transmissions, in combination, a power shaft, a load shaft, a compound epicyclic gear having two elements adapted to be coupled to said power shaft one of which is adapted to provide reaction for geared drive when not so coupled to said shaft, two elements fixed for rotation with said load shaft, and a forward drive reaction element; locking means for said reaction element, a clutch arranged to couple one of said elements to the power shaft, a fluid turbine drive unit, a second clutch arranged to couple the second of said elements to said power shaft through said unit, actuation means for said locking means and said clutches, and controllable servo means effective to energise said actuation means for selective drive between said shafts to provide two forward geared speed ratios, direct drive and reverse gear ratio.

9. In power transmissions, in combination, a power shaft, a load shaft, a compound epicyclic gear having two elements adapted to be coupled to said power shaft one of which is adapted to provide reaction for geared drive when not coupled to said power shaft, two elements fixed for rotation with said load shaft, and a forward drive reaction element; locking means for said reaction element, a clutch arranged to couple one of said elements to the power shaft, a fluid turbine drive unit, a second clutch arranged to couple the second of said elements to said power shaft through said unit, actuation means for said locking means and said clutches, and means controlling said actuation means for establishing two forward geared speed ratios, direct drive, and reverse gear ratio between said shafts.

10. In power transmissions, the combination of a power shaft, a load shaft, a compound epicyclic gear unit adapted to couple said shafts for three forward ratios and reverse speed ratio and including one reaction supporting element for low gear drive and a second reaction supporting element for reverse gear drive, a fluid turbine unit arranged to drive an element of said gear unit, a clutch adapted to couple said fluid unit with said power shaft, a second clutch adapted to couple said power shaft to a second element of said gear unit, an actuating means adapted to engage said first named clutch and establish drive through said fluid turbine unit for starting and driving the said load shaft in low speed ratio, a second actuating means adapted to engage said second named clutch and establish a positive couple through said gears for driving said load shaft in second speed ratio, control means to energize both of said actuating means and to engage both of said clutches for establishing a direct drive couple on said load shaft through said gears and said fluid turbine unit and braking means for said reaction elements likewise energizable by said control means, effective to establish alternate drive between low gear and in reverse while said first named clutch remains energised for maintaining engine connection through said fluid turbine unit.

11. In power transmissions, the combination of a power shaft, a load shaft, a compound epicyclic gear unit adapted to couple said shafts for three forward ratios and reverse speed ratio and including low gear and reverse reaction supporting elements, a fluid turbine unit arranged to drive an element of said gear unit, a clutch adapted to couple said fluid unit with said power shaft, a second clutch adapted to couple said power shaft to a second element of said gear unit, braking means for said reaction elements actuating means adapted to engage said first named clutch and establish drive through said fluid turbine unit for starting and driving the said load shaft in low speed ratio while energizing the braking means for said low gear reaction element, a second actuating means adapted to engage said second named clutch and establish a positive couple through said gears for driving said load shaft in second speed ratio while said low gear reaction braking means remains engaged, and means controlling the energisation of each of said actuating means individually and both of said actuating means simultaneously for providing direct drive between the said shafts through said gears and said fluid unit while said braking means are de-energized.

12. In power transmissions, the combination of a power shaft, a load shaft, a compound epicyclic gear unit adapted to couple said shafts for three forward ratios and reverse speed ratio including reaction supporting elements for low and reverse gear drive, a fluid turbine unit arranged to drive an element of said gear unit, a clutch adapted to couple said fluid unit with said power shaft, a second clutch adapted to couple said power shaft to a second element of said gear unit braking means for said reaction elements, a primary actuating means adapted to engage said first named clutch and establish drive through said fluid turbine unit for starting and driving the said load shaft in low speed ratio while providing actuation for the braking means for said low gear reaction element, a second actuating means adapted to engage said second named clutch and establish a positive couple through said gears for driving said load shaft in second speed ratio, and auxiliary power means effective to energise both of said first and said second actuating means and to engage both of said clutches for establishing a direct drive couple on said load shaft through said gears and said fluid turbine unit while requiring de-energization of said braking means for both of said reaction supporting elements.

13. In power transmissions, the combination of a power shaft, a load shaft, a compound epicyclic gear unit adapted to couple said shafts for three forward ratios and reverse speed ratio, a fluid turbine unit arranged to drive an element of said gear unit, a clutch adapted to couple said fluid unit with said power shaft, a second clutch adapted to couple said power shaft to a second element of said gear unit, an actuating means adapted to engage said first named clutch and establish drive through said fluid turbine unit for starting and driving the said load shaft in low speed ratio, a second actuating means adapted to engage said second named clutch and establish a positive couple through said gears for driving said load shaft in second speed ratio for continuing drive while the fluid turbine unit is idling without transmitting torque, and fluid pressure servo means effective to energise both of said actuating means and to engage both of said clutches for establishing a direct drive couple on said load shaft through said gears and said fluid turbine unit.

14. In power transmissions, the combination of a power shaft, a load shaft, a compound epicyclic gear composed of a primary sun gear, a primary annulus gear, primary planet gears meshing with said sun gear and said annulus, a carrier for said primary planet gears, a secondary sun gear, a secondary annulus gear, and secondary planet gears meshing with said secondary sun and annulus gears, a carrier for said secondary planet gears, a connecting drum joining said first named carrier and said secondary annulus gear, a connection coupling said primary annulus gear and said second named carrier with said load shaft, braking means for said drum and said secondary sun gear, and controllable coupling means comprising two clutches effective to connect said sun gear or said first named carrier with said power shaft, or to connect both said gear and said carrier for unitary rotation with said power shaft.

15. In power transmissions, in combination, a power shaft, a load shaft, a drum connected to said power shaft, a fluid turbine device housed within said drum and having an input and an output rotor, a compound epicyclic gear unit adapted to drive said load shaft and having two elements arranged to be coupled to said power shaft and said output rotor respectively, a forward drive reaction element for said gear unit, locking means for said reaction element, a clutch disc rotating with one of said gear unit elements, a second clutch disc fixed to rotate with the said input rotor of said device, selectively operable clamping means rotating with said drum and operable to compel one or both of said discs to rotate with said drum, and actuating means for said reaction locking means, and arranged to lock the same when said clamping means selectively engages the second one of said clutches for initial drive transmitted by said turbine device, to hold same engaged while said clamping means has released the said second and engaged said first-named clutch disc for positively coupled drive between said drum and said load shaft, and to release the said locking means when the clamping means engages both clutches for establishing direct drive maintained through the coupling action of said fluid turbine device connected by said second-named clutch disc.

16. In power transmissions, in combination, a power shaft, a load shaft, a drum connected to said power shaft, a fluid turbine device housed within said drum and having an input and an output rotor, a compound epicyclic gear unit adapted to drive said load shaft and having two elements arranged to be coupled to said power shaft and said output rotor respectively, a reaction element for said gear unit, locking means for said reaction element, a clutch disc rotating with one of said gear unit elements, a second clutch disc fixed to rotate with the said input rotor of said device and arranged to be energized for low gear drive and for providing a direct drive couple only, selectively operable clamping means rotating with said drum and operable to compel one or both of said discs to rotate with said drum, and actuating means for said reaction locking means and subject to the reaction forces applied thereto and arranged to lock the same when said clamping means selectively engages the second one of said clutches for starting the vehicle into motion from rest and in providing low gear drive, and arranged to release the said locking means when the clamping means engages both clutches for establishing direct drive maintained through the coupling action of said fluid turbine device connected by said second-named clutch disc to said drum.

17. In power transmissions, in combination, a power shaft, a load shaft, a drum connected to said power shaft, a fluid turbine device housed within said drum and having an input and an output rotor, a compound epicyclic gear unit adapted to drive said load shaft and having two elements arranged to be coupled to said power shaft and said output rotor respectively, a reaction element for said gear unit, locking means for said reaction element, a clutch disc rotating with one of said gear unit elements, a second clutch disc fixed to rotate with the said input rotor of said device, selectively operable clamping means rotating with said drum and operable to compel one or both of said discs to rotate with said drum, said actuating means for said reaction locking means responsive to the direction of torque upon said reaction element of said gear unit and arranged to lock the same to said reaction element when said clamping means selectively engages one of said clutches, and to release said locking means upon there being a change in the direction of reaction torque when the clamping means is energised to engage both of said clutches for direct drive between said shafts.

18. In power transmissions, in combination, a power shaft, a load shaft, a compound epicyclic gear unit having two power input elements and constantly coupled to said load shaft; a reaction element for said unit, separately operable clutch means for said elements adapted to couple them individually or simultaneously to said power shaft and locking means consisting of a friction band for said reaction element arranged to self-energise under reaction torque applied to said element and to self-release under forward torque thereon, and including an additional means adapted to apply a releasing force to said locking means in phase with said self-releasing action, said locking means coacting so as to unlock and release said element when subject to a predetermined torque component caused by engagement of said clutches.

19. In power transmissions, in combination, a power shaft, a load shaft, a compound planetary gear unit constantly coupled to said load shaft and having two power input elements, a reaction member for said unit for establishing low and second speed gear ratios, a locking mechanism for said member, a fluid turbine drive device constantly coupled to one of said elements, a clutch adapted to couple the drive of said compound gear unit through said device to said power shaft when said member and locking mechanism are made active to establish low gear drive, a second clutch adapted to couple the other of said elements to said power shaft when said member and mechanism are made active to establish second gear drive, and actuating means for said clutches and said mechanism effective to establish selective drive in which the fluid turbine drive device delivers all of the driving torque for low speed ratio of said unit, is relieved of all driving torque when said unit is operating at said second speed ratio, and in which the fluid turbine drive device provides a direct drive couple in conjunction with the compound gear unit when said clutches are both engaged.

20. In power transmissions, in combination, an engine shaft and a load shaft, a compound planetary gear unit adapted to drive said load shaft comprising two simple planetary groups each embodying a sun gear, an annulus gear and meshing planet gears supported by a carrier, a reaction member for the sun gear of the second of said groups, a locking means for said member, a connecting drum joining the annulus gear of said second group with the carrier of the first group, a brake for said connecting drum, a flange rotating with said load shaft constantly coupled to the annulus gear of said first named group and to the carrier of said second named group, a fluid turbine device having input and output rotors, a primary shaft connecting the said output rotor and the sun gear of said first named gear group, a secondary shaft connected to said drum, a clutch shaft attached to said input rotor, clutch mechanisms selectively operative to connect said clutch shaft and said secondary shaft with said engine shaft, actuating means for said brake, said member, and for said clutch mechanisms, and control means for said actuating means operative to provide a range of forward speed ratios by selective actuation of said clutches and said locking means.

21. In power transmission, in combination, a power shaft, a load shaft, a compound planetary gear yielding forward and reverse drive and having at least two potentially driving elements, and an output member constantly connected to said load shaft, a fluid turbine drive device having an impeller, and a rotor constantly connected to one of said gear driving elements, two alternately and commonly actuable clutches one of which is adapted to connect said power shaft with one of said gear elements directly and the other of which is adapted to couple another of said gear elements therewith by clutching said impeller to said power shaft; at least two reaction elements in said gear, one of which is constantly connected with one of said potentially driving elements, the other of which is adapted to establish low and intermediate gear drive in said compound planetary gear, actuation means for said clutches and for said reaction elements, and selective control means for said actuation means shiftable to select actuation of said second named clutch at the same time actuation of said first named reaction elements is selected for providing reverse gear drive between said shafts.

22. In a combination such as set forth in claim 21 the subcombination of further settings of said control means for said actuation means effective to establish actuation of said second named clutch with actuation of said second named reaction element for providing low gear drive between said shafts.

23. In a combination such as set forth in claim 21 the subcombination of said control means being shiftable to establish actuation of said second named reaction element with actuation of said first named clutch while relieving said device of driving torque for providing geared intermediate speed drive which may proceed indefinitely.

24. In a combination such as set forth in claim 21 the subcombination of said control means being shiftable to establish actuation of the second of said clutches while the first said clutch remains engaged, during an interval when the said actuation means for said second named reaction element is being de-energised for providing a direct drive couple between said shafts, the said second-named reaction element providing torque reaction until said second named clutch is fully actuated.

OLIVER K. KELLEY.